April 7, 1959     D. WILLISON     2,880,885
CUSHIONING DEVICE
Filed April 1, 1955

INVENTOR.
DONALD WILLISON
BY
ATTORNEY

United States Patent Office 2,880,885
Patented Apr. 7, 1959

2,880,885

CUSHIONING DEVICE

Donald Willison, Maple Heights, Ohio, assignor to National Malleable and Steel Castings Company, Cleveland, Ohio, a corporation of Ohio Application April 1, 1955, Serial No. 498,721

6 Claims. (Cl. 213—45)

This invention relates to a cushioning unit for shock absorbing mechanisms and more specifically to a cushioning unit for railway car draft gears and buffers.

Prior shock absorbing mechanism employed either metallic springs and associated friction means or plurality of individual rubber pads arranged in series as a unit. Such mechanism must be able to sustain high fluctuating loads for considerable periods of time without creeping or slipping and also must be able to withstand exceptionally high shock loads.

The present invention is capable of meeting such requirements by the provision of a single, composite, rubber cushioning unit.

The primary object of the invention is to provide a composite shock absorbing medium, which will be hereinafter referred to as a mono-unit, and which comprises cushioning material, such as rubber, and spaced metal plates molded to the rubber to form an integral unit. The rubber material embodies a plurality of openings therein to accommodate the flow of said rubber material which becomes distorted when subjected to compressive forces. This is distinguished from the conventional single pad arrangement, wherein a plurality of individual rubber pads are held in proper alignment by various methods, one of which, for example, comprises an arrangement of projections and corresponding recesses in the rubber cushions, as shown in Willison-Spence Patent No. 2,686,667, dated August 17, 1954.

Other objects and advantages of the invention will be apparent from the following description, taken in conjunction with the accompanying drawings, wherein.

Figure 1:
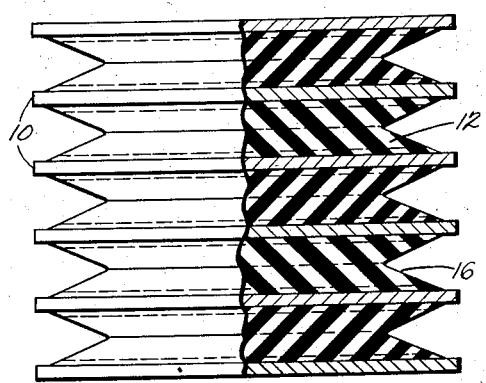
Fig. 1 is a side elevational view of a mono-unit cushioning device embodying the invention, shown partly in section.
Figure 2:
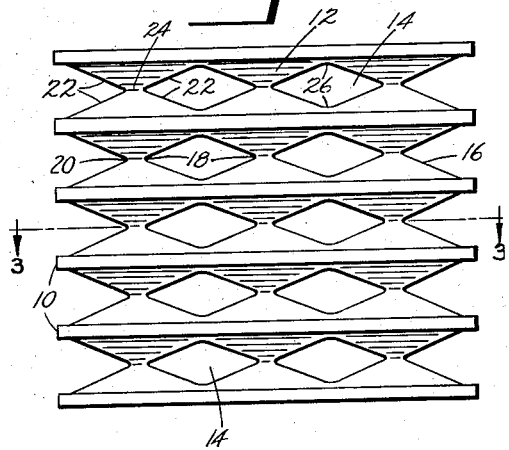
Fig. 2 is an end elevational view of the mono-unit shown in Fig. 1.
Figure 3:
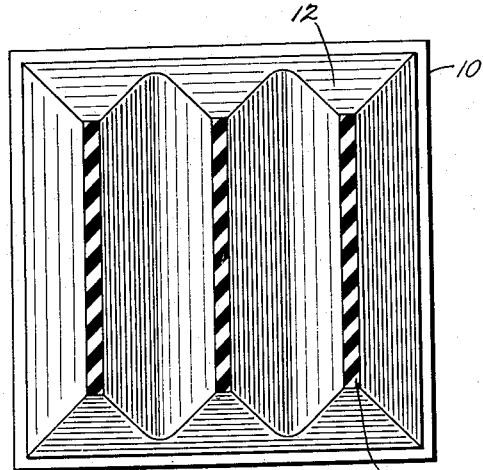
Fig. 3 is a horizontal sectional view taken along line 3—3 of Fig. 2.

Referring particularly to Figs. 1, 2 and 3 of the drawings, the mono-unit comprises a series of spaced, parallel metal plates 10 in alternate relation with, and joined by layers of rubber cushioning material 12 forming a plurality of resilient cushions which are bonded to the adjacent plates. Each layer of the rubber material 12 is formed with a series of spaced openings 14, each of which extends entirely through the unit. These openings in each of the cushions are preferably in generally vertical alignment to form a columnar-like arrangement and are substantially diamond-shaped when the rubber is in free or unstressed condition. In the embodiment shown, openings 14 are situated equidistant from the adjacent plates. The outside or peripheral edges of the rubber between plates 10 are formed with V-shaped recesses 16, corresponding in shape to one-half of an opening 14.

The vertices 18 of openings 14 and vertices 20 of recesses 16 are formed at the juncture of faces 22. These vertices form a small jointless neck of rubber 24 which serves to join the opposing cushions of rubber. In order to alleviate stress concentrations at these points, when the unit is placed under compression, these vertices are rounded. In the embodiment shown, the vertices 18 and 20 are rounded at as small a radius as practical in order to maintain a minimum volume of rubber in neck portions 24, which are initially compressed upon compression of the unit. This construction, of course, keeps the initial cushioning resistance of the unit to a minimum and provides a unit having a comparatively soft initial cushioning action. At the other ends of openings 14 are spaced vertices 26 (Fig. 2), which are rounded at a comparatively larger radius than that of vertices 18 and 20 in order to maintain a layer of predetermined thickness of rubber between vertices 26 and the plates 10 to thus enable facile bonding of the cushioning material to the metal plates and permit proper flow of the rubber during compression of the unit. The opposing vertices 18, as illustrated, are disposed midway between the adjoining metal plates 10. It will be observed that diamond-shaped openings 14 in effect form a corrugated configuration on the face of the rubber. It will thus be seen that the mono-unit is composed of a series of plates and rubber cushions which have been molded into a single unit.

It has been found that the shape and size of openings 14 are of importance in order to obtain the proper flow of the rubber under compression. More particularly, when the unit is subjected to a substantial compressive force, openings 14 must be large enough to accommodate the flow of rubber therein to the extent that the outward flow of rubber into the outer recesses 16 will not extend beyond the edge of plates 10 when the unit is compressed to approximately 48% of its uncompressed length. In addition, openings 14 facilitate the manufacture of the unit by accommodating mold elements which serve the dual function of forming the diamond-shaped interior contour of the openings and introducing heat into the interior of the unit to cure the rubber therein.

Figure 5:
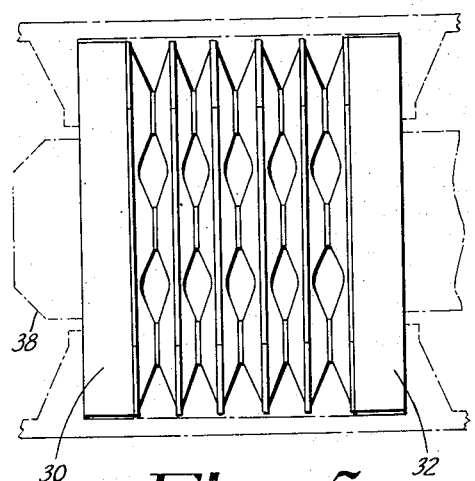
Fig. 5 is a plan view, partly in section, of a railway car draft gear embodying the invention.

Fig. 5 shows the mono-unit applied between front and rear followers 30 and 32 to form a typical railway draft gear, with yoke 38 encircling the assembly. Compression of the mono-unit between the followers by either a draft or buffing force causes the rubber material to flow into openings 14. More specifically, as the applied load increases, the opposite faces 22 of openings 14 (Fig. 2) tend to approach each other until the openings are completely filled. At the same time, the rubber material also flows outwardly toward the periphery of plates 10. This continues as the unit is being compressed until openings 14 are substantially filled, at which point the recesses 16 have also been closed and the rubber is substantially flush with the edges of the plates. Once openings 14 and recesses 16 are filled, the unit offers a very high resistance to further compression, which characteristic provides for effective cushioning of unusually heavy shocks or compressive loads. It is thus seen that the mono-unit provides a comparatively soft action initially and as the compressive load increases, the resistance of the unit correspondingly increases.

As a notable feature of the invention, the mono-unit has the particular advantage of remaining intact under all service conditions. Previously, when a group of individual rubber pads were used in a draft gear, normal wear of the rubber pads and of the associated followers and draft stops eventually resulted in the pads fitting loosely in the draft gear pocket, which caused the pads to become misaligned with respect to each other. In the mono-unit, what had previously been individual pads, are now joined in series into a single unit by neck portions 24 which serve to maintain the plates and rubber in alignment at all times. Thus, even if the mono-unit should fit loosely in the draft gear pocket, the aforementioned misalignment will not occur since the rubber cushions and plates have been molded together as a unit.

Figure 4:
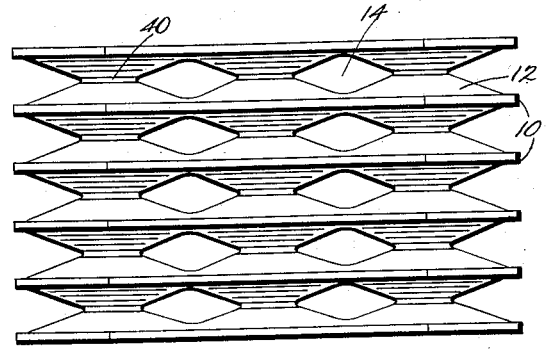
Fig. 4 is an end elevational view of a modified form of mono-unit embodying the invention.

Fig. 4 illustrates a modification of the invention, wherein neck portions 40 have been made substantially thicker than those in the previous embodiment. This construction materially increases the area of rubber which is initially compressed upon compression of the unit, with the result that the initial cushioning resistance of the unit is substantially increased. This latter action is particularly desirable for use in freight cars, while the unit illustrated in Figs. 1-3 is particularly applicable for passenger cars wherein softer initial cushioning action is desirable. Also, in Fig. 4 modification, openings 14 must be formed large enough to accommodate all of the rubber tending to flow therein such that no excess rubber remains to flow beyond the edges of plates 10, when the mono-unit is compressed to approximately 48% of its uncompressed length.

An additional advantage of the mono-unit resides in the fact that it facilitates assembly of a draft gear in which one or more cushioning units are employed, since there are fewer parts to be handled as compared with a gear employing cushioning units comprising several individual rubber pads. It is economical to manufacture and has the particular advantage of remaining intact as a unit under all service conditions.

While throughout this specification the term "rubber" has been used in reference to the cushioning material, it will be understood that any similar cushioning material may be utilized in its place.

The terms and expressions which I have employed are used as terms of description and not of limitation, and I have no intention, in the use of such terms and expressions of excluding any equivalents of the features shown and described or portions thereof, but recognize that various modifications are possible within the scope of the invention claimed.

I claim:

1. In a railway draft rigging, an integrally bonded unit comprising a series of generally parallel plates of metal in alternate bonded relation with layers of a rubber cushioning material, each layer having a single series of openings successively spaced in one lengthwise direction of the layer and extending parallel to each other entirely through the layer in a direction transverse to said one direction, said openings being spaced intermediately within each layer from the plates bonded thereto, the openings being arranged in rows extending in a direction generally perpendicular to said layers and plates, each row comprising an opening from each of said series, said rows being spaced in said one direction to provide continuous columns of metal and said material extending in said perpendicular direction.

2. The draft rigging of claim 1 wherein: the openings have a diamond-shaped cross-section of which the pair of opposite vertices furthest apart are aligned approximately parallel to the layers and plates and the other pair of vertices are aligned approximately perpendicularly to the layers and plates.

3. The draft rigging of claim 1 wherein: substantially the entire periphery of each layer is formed with a wedge-shaped recess.

4. The draft rigging of claim 1 wherein: the openings have a diamond-shaped cross-section of which the pair of opposite vertices furthest apart are aligned approximately parallel to the layers and plates and substantially the entire periphery of each layer is formed with a wedge-shaped recess; and said openings and recesses having such volumetric capacity as to be approximately filled by said material when the unit is compressed to 48 percent of its uncompressed length.

5. The draft rigging of claim 2 wherein: said columns comprise jointless neck portions of said material, each neck portion extending between, and the ends thereof being defined by, the vertices nearest together of two adjacent openings in the same layer; and said vertices being rounded to relieve concentration of stress therein during compression of the unit.

6. The draft rigging of claim 2 wherein: the vertices of the second-named pair are rounded with a radius which provides a predetermined thickness of said material between the openings and the plates.

References Cited in the file of this patent

UNITED STATES PATENTS

| | | |
|---|---|---|
| 2,321,845 | Nystrom et al. | June 15, 1943 |
| 2,322,193 | Kaemmerling | June 15, 1943 |
| 2,510,353 | Travilla | June 6, 1950 |
| 2,640,603 | Willison et al. | June 2, 1953 |
| 2,686,667 | Willison et al. | Aug. 17, 1954 |